May 5, 1931. A. B. BELL 1,803,835
RECLINING SEAT
Filed June 3, 1929 3 Sheets-Sheet 3
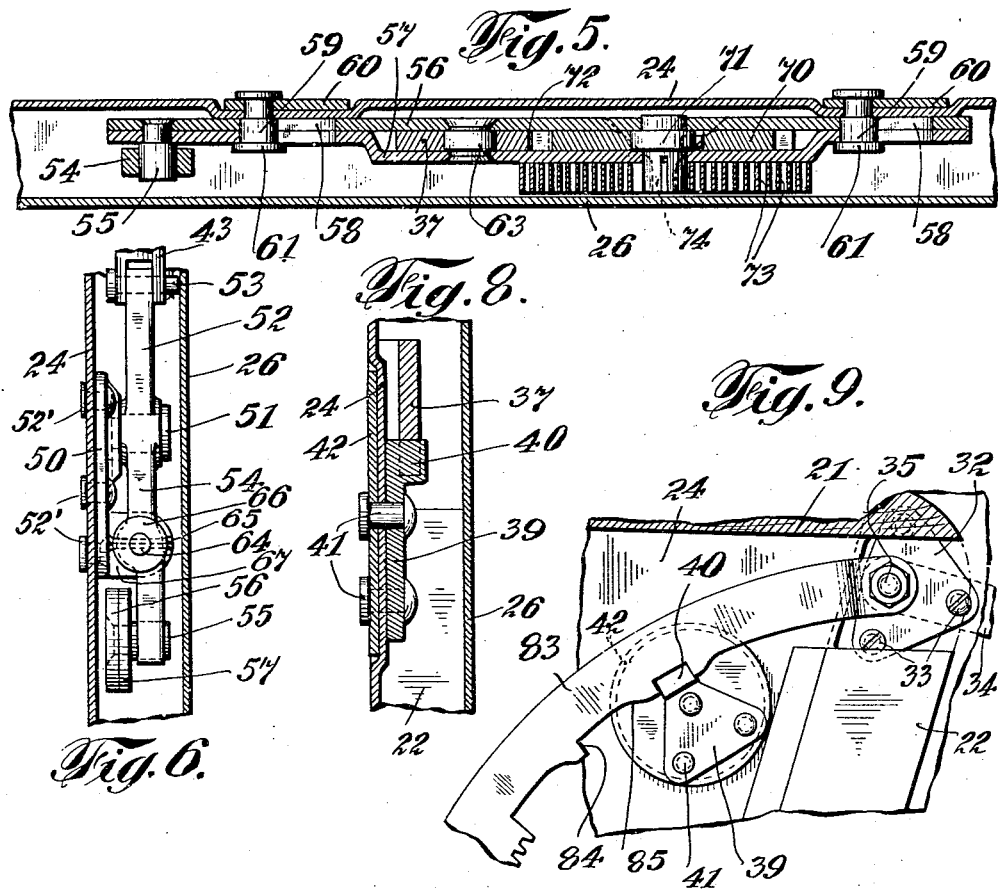
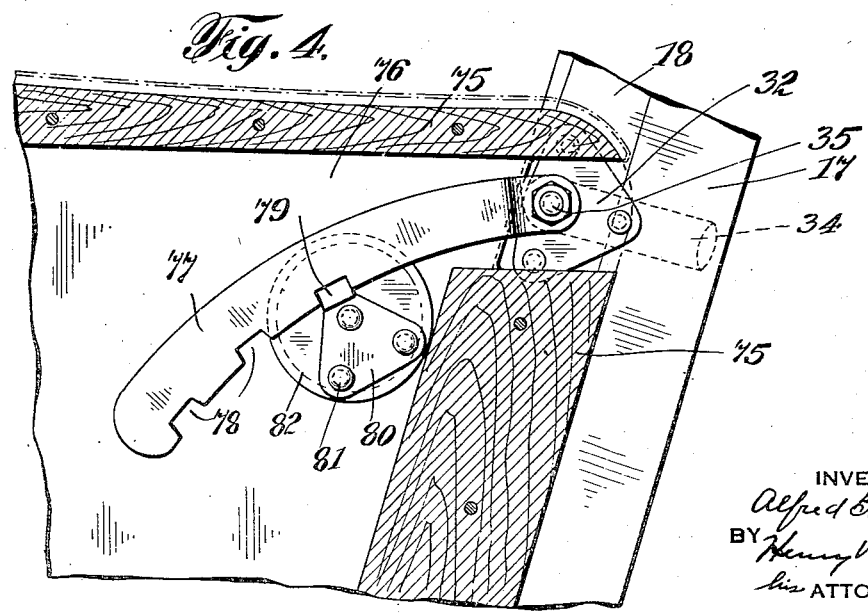
INVENTOR
Alfred B. Bell
BY Henry Van Arsdale
his ATTORNEY Patented May 5, 1931

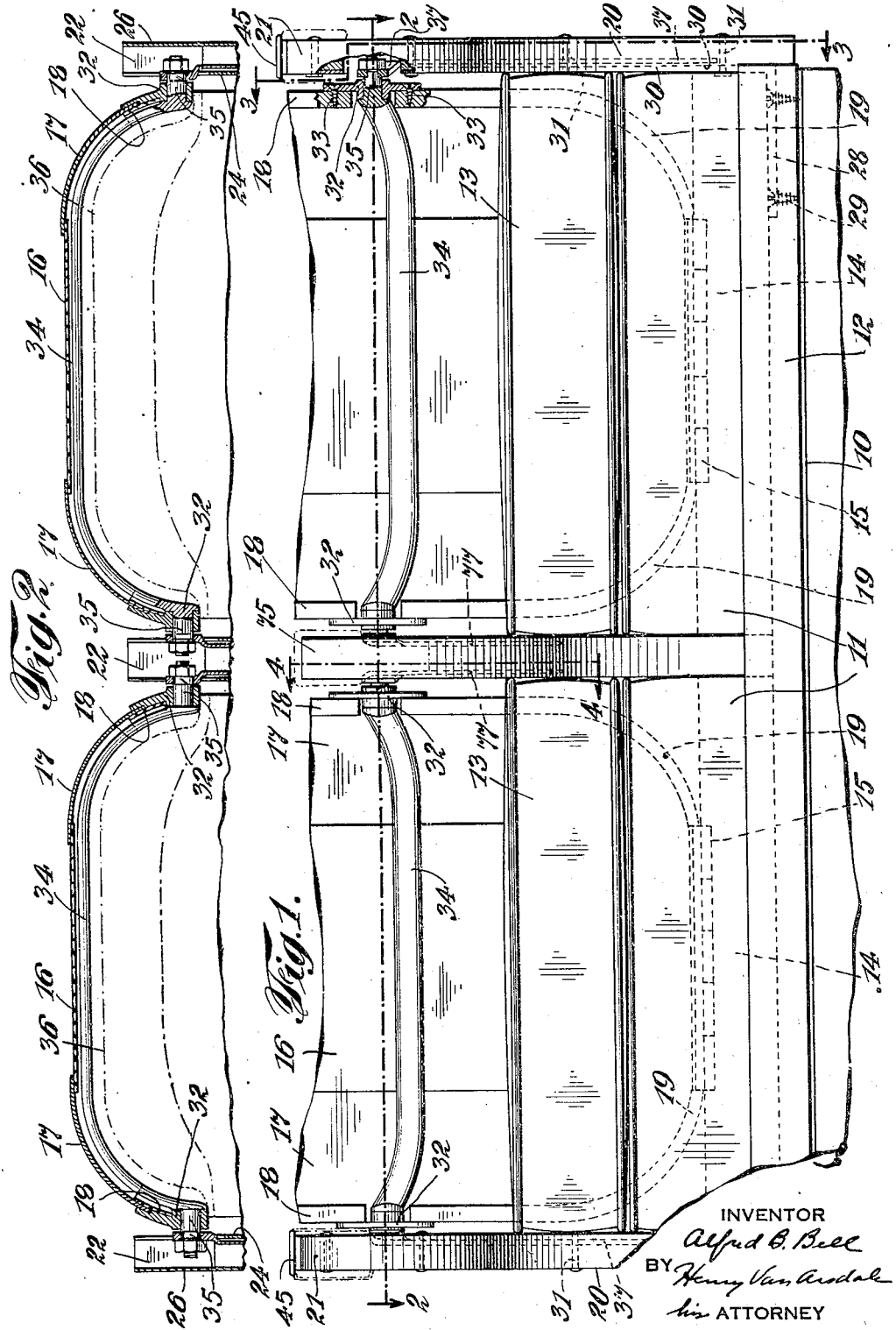

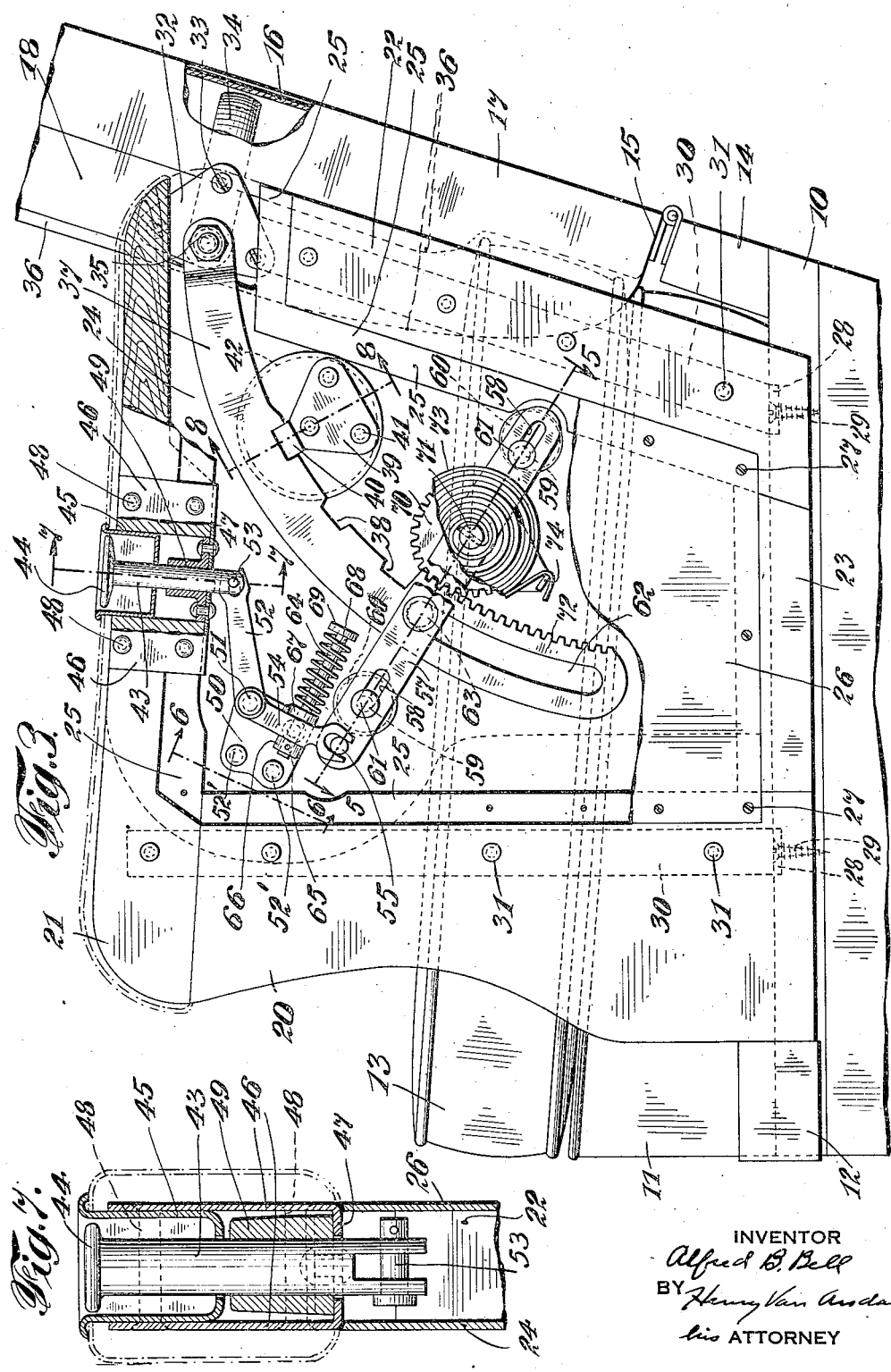

1,803,835

UNITED STATES PATENT OFFICE

ALFRED B. BELL, OF PHILADELPHIA, PENNSYLVANIA, ASSIGNOR TO HALE & KILBURN CO., OF PHILADELPHIA, PENNSYLVANIA, A CORPORATION OF DELAWARE

RECLINING SEAT

Application filed June 3, 1929. Serial No. 367,902.

This invention relates to reclining seats, and more particularly to seats for use in railway coaches, busses and tram cars, having a back rest adapted to be adjustably reclined.

To make busses and railway transportation attractive to the public requires that the seats be made as comfortable and convenient as possible. In long distance transportation, the passenger becomes weary if required to sit in a certain definite position throughout the length of the journey. Vehicle seats can be made very much more comfortable and restful if the back rest can be variously reclined in a variety of positions, as the passenger desires, so that he is not compelled to sit in one fixed position throughout the journey. To further increase the comfort of the passenger, the operative element for reclining the back rest should be conveniently located and easily manipulated, so that the back rest can be reclined in a variety of positions with the least effort on the part of the passenger, and can be quickly and conveniently restored to upright position by the passenger or by a trainman.

The provision of seats having backs which may be adjusted to different inclinations is not broadly novel. However, reclining seats have been used to a very small extent for passenger transportation, for instance in railway or tram cars or automotive busses because of various objectionable features. For instance, it is of utmost advantage, especially in interurban service, to provide as many seats as possible in each car or bus. Heretofore reclining seats have required a large amount of space and have not been suitable for such use on account of the consequent reduction in the seating accommodations of the car or bus. Further, the reclining mechanism occupied considerable space under the seat, interfering with the installation of electric heaters under the seats and rendering it difficult to clean under the seat. A further objection has been that much of the reclining mechanism is exposed, thus having a tendency to collect dust and dirt, and soiling the clothes of passengers. Further, the exposed parts often interfere with passengers entering or leaving the seats.

Accordingly, a principal object of this invention is to provide a reclining seat which is free of the objections noted above, and therefore especially well suited for use in railway or tram cars or in automotive busses.

A further object of this invention is to provide a seat having a hinged back rest adapted to be adjustably reclined in a variety of reclining positions, in a simple and convenient manner requiring a minimum of effort, and provided with means for adjustably retaining the back rest in any one of a number of inclined positions.

Another object of this invention is to provide reclining mechanism for reclining seats, which is simple and light in construction, which is easy to manipulate, and which is strong and lasting in service, and will withstand great abuse without getting out of order.

Other objects of this invention will become evident as the disclosure proceeds.

In accordance with my invention the seat back is hinged at its lower edge to a suitable support. The reclining mechanism may include arcuate rack members pivotally secured to each side of the back above the hinge, and extending into an arm rest at each end of the seat. The rack members are preferably connected for movement in unison by a bar or rod housed within the seat back. Mechanism, housed within the arm rest at each end of the seat, is engageable with each rack member at different points to give the desired adjusted inclination to the seat back, this mechanism being readily disengageable from the rack members by the passenger or by a trainman to permit the inclination of the seat back to be altered. Means are also preferably provided which act to return the seat back to upright position when released, these means being also enclosed entirely within one of the arm rests.

In order that a clearer understanding of my invention may be had, attention is hereby directed to the accompanying drawings, forming a part of this application and illustrating certain possible embodiments of my invention.

Referring to the drawings, Figure 1 is a front elevational view of a double vehicle seat having my novel reclining mechanism associated with the hinged back rest, certain parts being broken away to more clearly show certain features of the construction;

Figure 2 is a horizontal cross sectional view of the individual back rest portions of a double seat showing more particularly that portion of the reclining mechanism contained within the back rest portions, the view being taken on line 2—2 of Figure 1;

Figure 3 is an enlarged vertical end view of my seat, certain parts being broken away to more clearly show the reclining mechanism construction concealed within one of the arm rest portions, the view being taken on line 3—3 of Figure 1;

Figure 4 is a vertical cross sectional view through the middle arm rest portion disposed between adjacent individual seat cushions, showing in particular the rack member and cooperating lug element therein positioned, the view being taken on line 4—4 of Figure 1;

Figure 5 is an enlarged fragmentary cross sectional view showing certain parts of the recliner mechanism hidden within one of the rest portions of the seat, this view being taken on line 5—5 of Figure 3;

Figure 6 is an enlarged fragmentary cross sectional view showing other parts of the recliner mechanism hidden within one of the arm rest portions, the view being taken on line 6—6 of Figure 3;

Figure 7 is an enlarged fragmentary cross sectional view showing more particularly the push button device by means of which the hinged back rest portion is manipulated into the desired reclining position, the view being taken on line 7—7 of Figure 3;

Figure 8 is an enlarged fragmentary cross sectional view through one of the rack members and its cooperating lug element, the view being taken on line 8—8 of Figure 3 and Figure 9 is a fragmentary view of a modified form of rack member which may be used in place of the rack members shown more particularly in Figures 3 and 4.

Similar reference characters refer to similar parts throughout the several views of the drawings.

Referring to the drawings, I have shown my back rest reclining mechanism associated with a double vehicle seat having a pair of individual seat cushions and a pair of individual reclinable back rests, the seat having a dividing arm rest portion separating the two individual seat cushions. It will be understood, however, that I contemplate using my seat back tilting mechanism with any type of seat and do not limit myself to either double seats or seats for vehicle use. For purposes of illustration only therefor, I show a double seat having a seat cushion supporting frame 10 supported on any suitable pedestal (not shown). A pair of individual spring assemblies 11 may be supported on the frame 10. A face plate 12 extending across the front of the supporting frame and around the front corners thereof may be provided to retain the spring assemblies 11 in proper position. Each of the individual seat cushions 13 may be supported directly on one of the spring assemblies 11. The top of each spring assembly 11 may be inclined rearwardly, as shown in Figure 3, to give a comfortable inclination to the seat cushions supported thereon.

A wall portion 14 is secured along the rear edge of the seat cushion supporting frame 10. Each of the individual back rest portions of the seat may be hinged at its lower edge, as by hinge 15, to the wall member 14. The back rest portion of the seat may be of any suitable construction. To insure the greatest possible seating comfort, however, I preferably construct my back rest portion so as to present a concave body fitting cushion surface. As shown more particularly in Figure 2, my back rest portion may be of sheet metal construction comprising a vertical plate portion 16, and curved side plate portions 17, welded or otherwise secured thereto. An upper reenforcing piece 18 and lower reenforcing piece 19, concealed within the upholstery, may be suitably secured to the outer edge of each of the curved side plates 17 to give stiffness and strength to the back rest in general. The inner concave side of each back rest portion is heavily upholstered, and the inside surface of the upholstering is preferably shaped to conform to the body, as shown in Figure 2.

The double vehicle seat, shown in the drawings, is provided with a pair of end arm rest portions and an intermediate dividing arm rest portion separating the individual seat cushions. It is understood, however, that the intermediate arm rest portion may be eliminated and the reclining mechanism made operative to tilt both individual back rest portions simultaneously, or if the back rest portion of the double seat should be made of one piece, to tilt the entire unitary back rest portion.

It will be further understood that my reclining mechanism may be associated with any form of arm rest portions, and is not limited solely to the particular arm rest construction shown in the drawings. For purposes of illustration only therefore, I show in Figure 3 an arm rest portion of hollow construction, with the reclining mechanism hidden therewithin. The end arm rest portion, as shown, comprises a framework consisting of a front post 20, a top arm rest support 21 of comfortable shape, a rear post 22, and a base piece 23, all suitably fitted and secured together. An inside cover plate 24 preferably of metal and secured to the framework, forms the inside wall of the arm rest, as shown more clearly in Figure 2. A groove 25 is cut around the inside edge of the framework to receive the outside cover plate 26 removably secured to the framework by means of screws 27. A hollow cavity is thus provided in the arm rest portion within which certain parts of my reclining mechanism is positioned.

The end arm rest portion may be vertically supported in a sturdy manner by means of a pair of spaced vertical brackets. Each bracket comprises a foot portion 28 secured to the supporting frame 10 by any suitable means, such as screws 29, and an upwardly projecting portion 30 secured to the inside face of the end arm rest portion by suitable means, such as bolts 31.

A journal block 32 is positioned at each side edge of each individual back rest, and is secured as by screws 33 to the spaced ends of the upper and lower reenforcing pieces 18 and 19. A rod member 34 extends longitudinally through the back rest and is provided at each end thereof with a shaft portion 35, which extends through and is journalled within the journal block 32 fixed to the side edge of the back rest portion. The rod member, as shown in Figure 2, is curved so as to conform and to lie closely along the sheet metal backing of the back rest portion. The rear side of the back rest upholstery 36 is spaced somewhat from the rod member 34, and the upper end of each reenforcing piece 19 is spaced from the lower end of reenforcing piece 18, so as to permit free swinging movement of the rod through a limited angle.

The upper end of the rear post member 22 terminates short of the rear end of the arm support member 21, so as to make room for the shaft portion 35 and the mechanism thereto attached, as shown more clearly in Figures 1, 2 and 3.

The reclining mechanism located within each of the end arm rest portions of the seat will now be described. The outer end of the shaft portion 35, extending into the end arm rest portion of the seat, is fixedly connected to one end of a rack member 37, so as to rotate together. The rack member is preferably of arcuate form, as shown in Figure 3, and may be provided with a plurality of spaced notches 38 along the lower edge thereof. The notched portion of the rack member is adapted to selectively engage with a lug element properly positioned and fixed to the end arm rest portion of the seat. The lug element comprises an attaching portion 39, and a lug portion 40, projecting laterally therefrom. The lug element may be secured to the inner side plate 24 of the arm rest portion, by means of rivets 41, extending through the attaching portion 39 of the lug element, the inner side plate 24 and a reenforcing and stiffening plate 42 as shown more particularly in Figures 3 and 8. The laterally projecting lug portion of the lug element is thus adapted to cooperatively engage with the notches cut in the lower edge of the rack member to retain the back rest in a variety of inclined positions.

A push button device is provided to lift the rack member out of engagement with the lug element when it is desired to adjust the back rest from one inclined position to another. To this end I provide a push button having a stem portion 43 and a head portion 44, as shown more particularly in Figures 3 and 7. The push button extends through a metallic cup member 45 seated within a suitable hole cut through the arm rest support 21. To strengthen the arm rest support at this point, a U-shaped member having side walls 46 and a bottom wall 47 is provided. The U-shaped member saddles the arm support member, and is secured thereto, as by bolts 48. The bottom wall 47 of the U-shaped strengthening member has a hole therein through which the stem portion 43 of the push button extends. The stem portion of the push button also slides within a guide collar 49 secured to the bottom wall 47.

An attaching plate 50, having a stud element 51 projecting laterally therefrom, is secured to the inner side plate 24 of the arm rest portion by rivets 52', or other suitable means, as shown more particularly in Figures 3 and 6. A bell crank lever is pivotally mounted on the stud element 51. The outer end of bell crank arm 52 is forked and operatively engages a pin 53 extending through the forked end of the stem portion 43 of the push button. Arm 54 of the bell crank lever is also forked at its outer end and engages a pin element 55 projecting laterally from a slide bar mounted on the inner side plate of the end arm rest portion.

The slide bar comprises a pair of members 56 and 57, one of which is deformed and is spaced from the other at its mid-section, as shown in Figure 5. The slide bar is provided with an elongated aperture 58 at each end thereof. A stud element 59 secured to the inner side plate 24 and reenforcing plate 60 projects thru each elongated slot. Each stud element is provided with a head portion 61 to sildably retain the slide bar thereon. The free end of the rack member 37 is inserted between the spaced members 56 and 57 comprising the slide bar. An elongated slot 62 is provided in the rack member. A headed pin 63 extends thru the elongated slot 62 of the rack member, and is secured to the spaced members 56 and 57 comprising the slide bar. The ends of the spaced members 56 and 57 may be welded or otherwise secured together.

It is now seen that the push button member, the bell crank lever, slide bar and the rack member are all operatively connected, so that when the push button is pressed downwardly the bell crank member is rocked to draw the slide bar upwardly and raise the rack member out of engagement with the lug element. The seat back portion can then be adjusted to any reclining position desired.

I provide resilient means to normally retain the rack member engaged with the lug element. A guide rod 64 is secured at one end thereof to the arm portion 54 of the bell crank lever by means of a cotter pin 65 which extends through the end of the guide rod and a collar portion 66 formed on one side of the arm portion 54. The guide rod slides through a guide collar 67 formed on the attaching plate 50. An expansible coil spring 68 surrounding the guide rod is retained between the head portion 69 of the guide rod and the guide collar 67. As is evident, this expansible spring normally operates to draw the arm portion 54 of the bell crank lever downwardly to keep the rack member 37 seated against and engaged with the lug element. When downward pressure is exerted on the push button, it operates against the expansible spring 68 to raise the rack member out of engagement with the lug element. By means of this device it is seen that the inclination of the seat can only be changed by manually operating the push button. Room is provided for the swinging movement of the rack member 37 by hollowing out a cavity in the end of the arm rest support 21, as shown in Figure 3.

Driving means are also provided to swing the back rest forwardly when the rack member is disengaged from its lug element, and/or body pressure is removed from the seat back portion. To this end, I provide a pinion 70 positioned between the spaced members 56 and 57 comprising the slide bar. The pinion is fixed to a shaft 71 projecting through and journalled to the spaced members 56 and 57 of the slide bar. The free end of the rack member is provided with a toothed portion 72 adapted to mesh with the teeth of the pinion. A strong clock spring 73 is wound upon one of the projecting ends of the shaft 71, as shown more particularly in Figures 3 and 5. The inner end of the clock spring is secured directly to the shaft 71, and the outer end of the clock spring is secured to a suitable lug 74 projecting from the inner side of the arm rest portion.

Now it is seen that when the back rest is swung backwardly, the rack portion of the rack member rotates the pinion clockwise, as shown in Figure 3. Since both the pinion 70 and the clock spring 73 are secured directly to the shaft 71, clockwise rotation of the pinion will operate to wind up the clock spring. This stored energy is retained by the clock spring until the rack member is lifted out of engagement with its lug element. When this occurs the clock spring operates to rotate the pinion counter clockwise, drawing the rack member downwardly and swinging the back rest portion forwardly. The shaft 71 with its pinion 70 and the clock spring 73 is carried directly by the slide bar, so that the pinion is always in engagement with the toothed rack portion 72 of the rack member regardless of the position of the slide bar or the rack member. The clock spring is, therefore, always ready to operate whenever the rack member is disengaged from its lug element and/or pressure is released from the back rest portion.

The intermediate arm rest portion may be constructed somewhat similar to the end arm rest portions of the seat. The intermediate arm rest portion may comprise a framework 75 of wood having a side wall plate 76 detachably secured to each side thereof. Suitable brackets (not shown) may be provided to rigidly secure the intermediate arm rest portion to the supporting frame 10.

To steady the back rest portion and to generally strengthen the construction, I preferably provide a rack member 77, such as shown in Figure 4, secured to the inner end of the rod member 34 and extending into the intermediate arm rest portion. The rack member 77 is fixedly secured at one end thereof to the shaft portion 35 of the rod member as heretofore described in connection with the rack member 37. The rack member is provided with the usual notches 78 spaced along the lower edge thereof, which are adapted to cooperatively engage with a lug element secured to one of the side wall plates 76 of the intermediate arm rest portion. This lug element comprises a lug portion 79 and an attaching portion 80 secured to one of the side wall plates by means of rivets 81 extending through the attaching portion 80 of the lug element, the side wall plate 76 and a stiffening plate 82. The back rest is thus supported at both ends thereof. By this arrangement a strong construction is obtained. The push button mechanism, however, need only be provided in one of the arm rest portions, such as the end arm rest portion as heretofore described. Manipulation of the rack member 37 by means of the push button device is transmitted through the rod member 34 extending through the back rest portion to the rack member 77. Each rack member is thus simultaneously manipulated into and out of engagement with its corresponding lug element when the reclining position of the back rest is to be adjusted.

When a double seat, as shown in the drawings, is provided with individual back rest portions and individual reclining mechanisms, an operating rack member 37 and its associated push button mechanism is housed within each end arm rest portion of the seat. The two rack members 77, one associated with each back rest portion of the seat, are both contained within the common intermediate arm rest. A lug element, cooperating with its corresponding rack member, is secured to the inside face of each side wall plate 76. Both side wall plates 76 are detachable from the intermediate arm rest framework so that access may be had to the reclining mechanism housed therein when repairs are required. The outer side plate 26 associated with each of the end arm rest portions of the seat are made detachable for the same reason. Each arm rest support 21 may be padded, if desired, and covered with a suitable covering material.

Although I have shown for purposes of illustration, the arm rest portions of my seat as made up of a wooden framework with detachable side plates, it is understood that I also contemplate making the arm rest portions of the seat entirely of metal. For example, the end arm rests may comprise an inner metallic pan shaped member having flanged edges to which the outer side plate is detachably secured. The intermediate arm rest may comprise a pair of stamped metallic pan shaped members suitably secured together to form a hollow housing to contain parts of the reclining mechanism.

As a modified construction, I may substitute the rack member 83, shown in Figure 9, for the rack members heretofore described. In this construction, the notches along the lower edge of the rack member are so cut as to provide an abutment wall 84 which limits the backward reclining movement of the back rest portion, and a cam portion 85 along which the lug element may ride when pressure is removed from the back rest portion. When such rack members are used, it is seen that the maximum backward inclined position of the seat back portion is determined by the position of the lug portion 40 in reference to one of the abutment walls 84. The means for holding the seat back portion in a certain inclined position have been eliminated, so that as soon as pressure is removed from the back rest portion the same will swing forwardly.

It is now seen that I have provided a seat especially adapted for public conveyances, which occupies comparatively little space and which yields the maximum comfort to the passenger. The seat cushion is inclined at a comfortable angle and the back rest can be positioned in a variety of inclined positions. The occupant of the seat is, therefore, not forced to maintain a certain sitting position on long journeys, but may variously recline himself on the seat to obtain maximum comfort. The reclining mechanism is all hidden within the arm rest portions and back rest portion of the seat where it is not only out of the way, but permits the seat to be given an attractive appearance. By thus concealing the reclining mechanism, the parts thereof can be maintained in better operative condition and tampering therewith by meddlesome passengers is avoided. Furthermore, the push button by means of which the occupant tilts the back rest, is conveniently arranged in the arm rest, so that he is able to tilt the back rest scarcely without effort. The tilting mechanism is made of few parts, sturdily constructed and easy to assemble.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:

1. In combination with a seat having an arm rest portion and a hinged back rest portion, of means for adjusting the inclination of said seat back portion, said means including a member hinged to said back rest portion at one end and having a toothed portion at the other end thereof, a pinion mounted on said arm rest portion and adapted to operatively engage the toothed portion of said member, and driving means associated with said pinion operative to swing said back rest portion forwardly when pressure against said seat back portion is removed.

2. In combination with a seat having an arm rest portion and a hinged back rest portion, of means for adjusting the inclination of said seat back portion, said means including a member hinged to said back rest portion at one end and having a toothed portion at the other end thereof, a lug element adapted to operatively engage said member to retain said back rest portion in the inclined position to which it has been adjusted, a pinion mounted on said arm rest portion and adapted to operatively engage the toothed portion of said member, and resilient means associated with said pinion operative to swing said back rest portion forwardly when said member is disengaged from said lug.

3. In combination with a seat having an arm rest portion and a hinged back rest portion, of means for adjusting the inclination of said back rest portion, said means including a member hinged to said back rest portion at one end and having a toothed portion at the other end thereof, a lug element adapted to variously engage said member to retain said back rest portion in the inclined position to which it has been adjusted, a bar slidably mounted on said arm rest portions and engaging said member, means for reciprocating said bar to move said member out of engagement with said lug, a pinion mounted on said bar and adapted to operatively engage the toothed portion of said member, and resilient means associated with said pinion operative to swing said back rest portion forwardly when said member is disengaged from said lug.

4. In a chair having a pivoted back and an arm, in combination, a rack bar secured to the back, a positioning lug therefor mounted on the arm structure, said bar having a slot, a member slidably mounted on the arm structure and engaging in the slot of the bar, a bell crank lever pivoted on the arm structure and engaging said slidable member, and means, including a pushbutton having a stem engaging said bell crank lever, whereby depression of the pushbutton rocks the bell crank lever to move said slidable member to disengage the rack bar from its positioning lug to permit adjustment of the inclination of the seat back.

5. In a chair having a pivoted back and and arm, in combination, a rack bar secured to the back, a positioning lug therefor mounted on the arm structure, said bar having a slot, a member slidably mounted on the arm structure and engaging in the slot of the bar, a bell crank lever pivoted on the arm structure and engaging said slidable member, means, including a pushbutton having a stem engaging said bell crank lever, whereby depression of the pushbutton rocks the bell crank lever to move said slidable member to disengage the rack bar from its positioning lug to permit adjustment of the inclination of the seat back, and resilient means engaging said bell crank lever to restore the pushbutton to raised position and to move the slidable member to engage the rack bar with its positioning pawl.

6. In a chair having a pivoted back and an arm, in combination, a rack bar secured to the back, a positioning lug therefor mounted on the arm structure, said bar having a slot, a member slidably mounted on the arm structure and engaging in the slot of the bar, a bell crank lever pivoted on the arm structure and engaging said slidable member, means, including a pushbutton having a stem engaging said bell crank lever, whereby depression of the pushbutton rocks the bell crank lever to move said slidable member to disengage the rack bar from its positioning lug to permit adjustment of the inclination of the seat back, said rack bar having a toothed portion, a pinion on the slidable member in constant mesh with said toothed portion, and spring means associated with said pinion adapted to rotate said pinion to draw said rack bar forwardly when disengaged from its positioning lug.

7. In a chair having a pivoted back and an arm, in combination, a rack bar secured to the back, a positioning lug therefor mounted on the arm structure, said bar having a slot, a member slidably mounted on the arm structure and engaging in the slot of the bar, a bell crank lever pivoted on the arm structure and engaging said slidable member, means, including a pushbutton having a stem engaging said bell crank lever, whereby depression of the pushbutton rocks the bell crank lever to move said slidable member to disengage the rack bar from its positioning lug to permit adjustment of the inclination of the seat back, resilient means engaging said bell crank lever to restore the pushbutton to raised position and to move the slidable member to engage the rack bar with its positioning pawl, said rack bar having a toothed portion, a pinion on the slidable member in constant mesh with said toothed portion, and spring means associated with said pinion adapted to rotate said pinion to draw said rack bar forwardly when disengaged from its positioning lug.

This specification signed this 28th day of May, 1929.

ALFRED B. BELL.